(12) United States Patent
Horiuchi et al.

(10) Patent No.: US 12,160,396 B2
(45) Date of Patent: *Dec. 3, 2024

(54) BASE STATION, TERMINAL, AND COMMUNICATION METHOD

(71) Applicant: Panasonic Intellectual Property Corporation of America, Torrance, CA (US)

(72) Inventors: Ayako Horiuchi, Kanagawa (JP); Hidetoshi Suzuki, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/158,353

(22) Filed: Jan. 23, 2023

(65) Prior Publication Data

US 2023/0163934 A1    May 25, 2023

Related U.S. Application Data

(63) Continuation of application No. 16/488,963, filed as application No. PCT/JP2018/001516 on Jan. 19, 2018, now Pat. No. 11,595,182.

(30) Foreign Application Priority Data

Mar. 17, 2017    (JP) ................. 2017-052863

(51) Int. Cl.
*H04L 5/00*       (2006.01)
*H04W 72/044*   (2023.01)
*H04W 72/23*     (2023.01)

(52) U.S. Cl.
CPC .......... *H04L 5/0094* (2013.01); *H04L 5/0053* (2013.01); *H04W 72/23* (2023.01); *H04W 72/044* (2013.01)

(58) Field of Classification Search
CPC .. H04L 5/0094; H04L 5/0053; H04W 72/042; H04W 72/044
See application file for complete search history.

(56) References Cited

U.S. PATENT DOCUMENTS 9,094,978 B2    7/2015   Chmiel et al.
9,369,248 B2    6/2016   Cheng et al.
(Continued)

FOREIGN PATENT DOCUMENTS

CN    103391577 A    11/2013
EP      2892172 A1     7/2015
(Continued)

OTHER PUBLICATIONS

3GPP, "3rd Generation Partnership Project; Technical Specification Group Radio Access Network; NR; Multiplexing and channel coding (Release 15)," 3GPP TS 38.212 V1.2.1, Dec. 2017. (82 pages).

(Continued)

*Primary Examiner* — Jung H Park
(74) *Attorney, Agent, or Firm* — Seed IP Law Group LLP

(57) ABSTRACT

In a base station, a DCI generation unit selects one pattern (mode) for use when data is allocated from among a plurality of patterns (modes) of a resource area where data (PDSCH) is allocated, and a transmission unit provides notification about setting information regarding the plurality of patterns (modes) by signaling of a higher layer and provides notification about the one pattern (mode) selected from the plurality of patterns by a downlink control signal (DCI).

12 Claims, 9 Drawing Sheets

(56) References Cited

U.S. PATENT DOCUMENTS

| | | |
|---|---|---|
| 2013/0301548 A1 | 11/2013 | Etemad et al. |
| 2015/0173064 A1 | 6/2015 | Kim et al. |
| 2016/0174194 A1 | 6/2016 | Suzuki et al. |
| 2016/0198443 A1 | 7/2016 | Chen |
| 2017/0290017 A1 | 10/2017 | Takeda et al. |
| 2017/0303220 A1 | 10/2017 | Sadeghi et al. |
| 2017/0318565 A1 | 11/2017 | Golitschek Edler von Elbwart et al. |
| 2018/0070264 A1* | 3/2018 | Saiwai .................. H04W 72/04 |
| 2019/0238247 A1* | 8/2019 | Lee ........................ H04L 5/0007 |
| 2019/0289668 A1* | 9/2019 | He ........................ H04L 5/0092 |

FOREIGN PATENT DOCUMENTS

| | | |
|---|---|---|
| JP | 2016007027 A | 1/2016 |
| WO | WO 2013170202 A1 | 11/2013 |
| WO | WO 2016047729 A1 | 3/2016 |
| WO | WO 2016070417 A1 | 5/2016 |
| WO | WO 2016186059 A1 | 11/2016 |

OTHER PUBLICATIONS

CATT, "Remaining issues on beamformed CSI-RS," R1-1702039, Agenda Item: 7.2.2.2, TSG-RAN WG1 Meeting #88, Athens, Greece, Feb. 13-17, 2017. (3 pages).

Huawei, HiSilicon, "Discussion on efficient utilization of BF CSI RS," R1-164858, Agenda Item: 6.2.3.1.2, 3GPP TSG RAN WG1 Meeting #85, Nanjing, China, May 23-27, 2016. (4 pages).

Nokia, "CR to 38.214 capturing the RAN1#92bis and RAN1#93 meeting agreements," R1-1807958, 3GPP TSG-RAN1 Meeting #93, Busan, Korea, May 21-25, 2018. (89 pages).

Rapporteur (Ericsson), "Corrections for EN-DC," RP-180479, 3GPP TSG RAN Meeting #79, Chennai, India, Mar. 19-22, 2016. (266 pages).

ZTE, ZTE Microelectronics, "Remaining details for aperiodic CSI-RS," R1-1611432, Agenda Item: 6.2.2.4.1, 3GPP TSG RAN WG1 Meeting #87, Reno, U.S.A., Nov. 14-18, 2016. (5 pages).

3GPP TSG RAN Meeting #73, RP-161596, "Revision of SI: Study on New Radio Access Technology," Sep. 2016.

3GPP TSG RAN WG1 #88, R1-1702219, "Group Common PDCCH", Feb. 2017.

3GPP TSG RAN WG1 Meeting #88, R1-1702225, "Dynamic resource sharing of control and data channel", Feb. 2017.

3GPP TSG RAN WG1 Meeting #88, R1-1702834, "Dynamic resource sharing between DL data and control channels", Feb. 2017.

Communication pursuant to Article 94(3) EPC dated Oct. 21, 2021 for the related European Patent Application No. 18767762.0-1205.

Huawei, HiSilicon, "Discussion on sPDCCH design," 3GPP TSG RAN WG1 Meeting #88, Agenda Item: 7.2.5.2.2.2, R1-1701731, Athens, Greece, Feb. 13-17, 2017, 16 pages.

International Search Report of PCT application No. PCT/JP2018/001516 dated Apr. 17, 2018.

The Extended European Search Report dated Feb. 19, 2020 for the related European Patent Application No. 18767762.0, 11 pages.

ZTE, ZTE Microelectronics, "ZTE Microelectronics, NR DL Control Channel Structure," 3GPP TSG RAN WG1 NR Ad-Hoc Meeting, Agenda Item: 5.1.3.1, R1-1700257, Spokane, USA, Jan. 16-20, 2017, 7 pages.

* cited by examiner

MODE 1

MODE 2

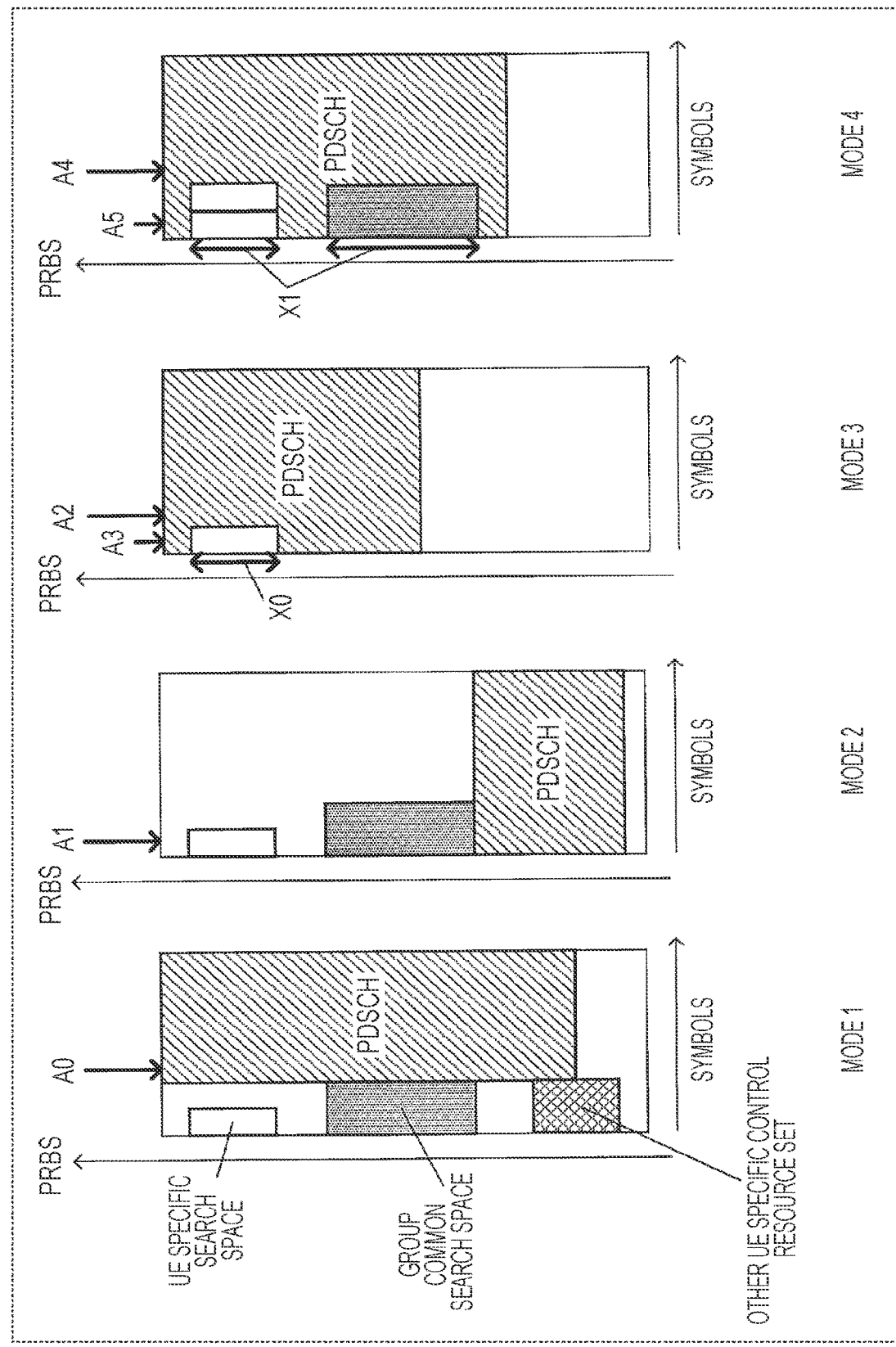

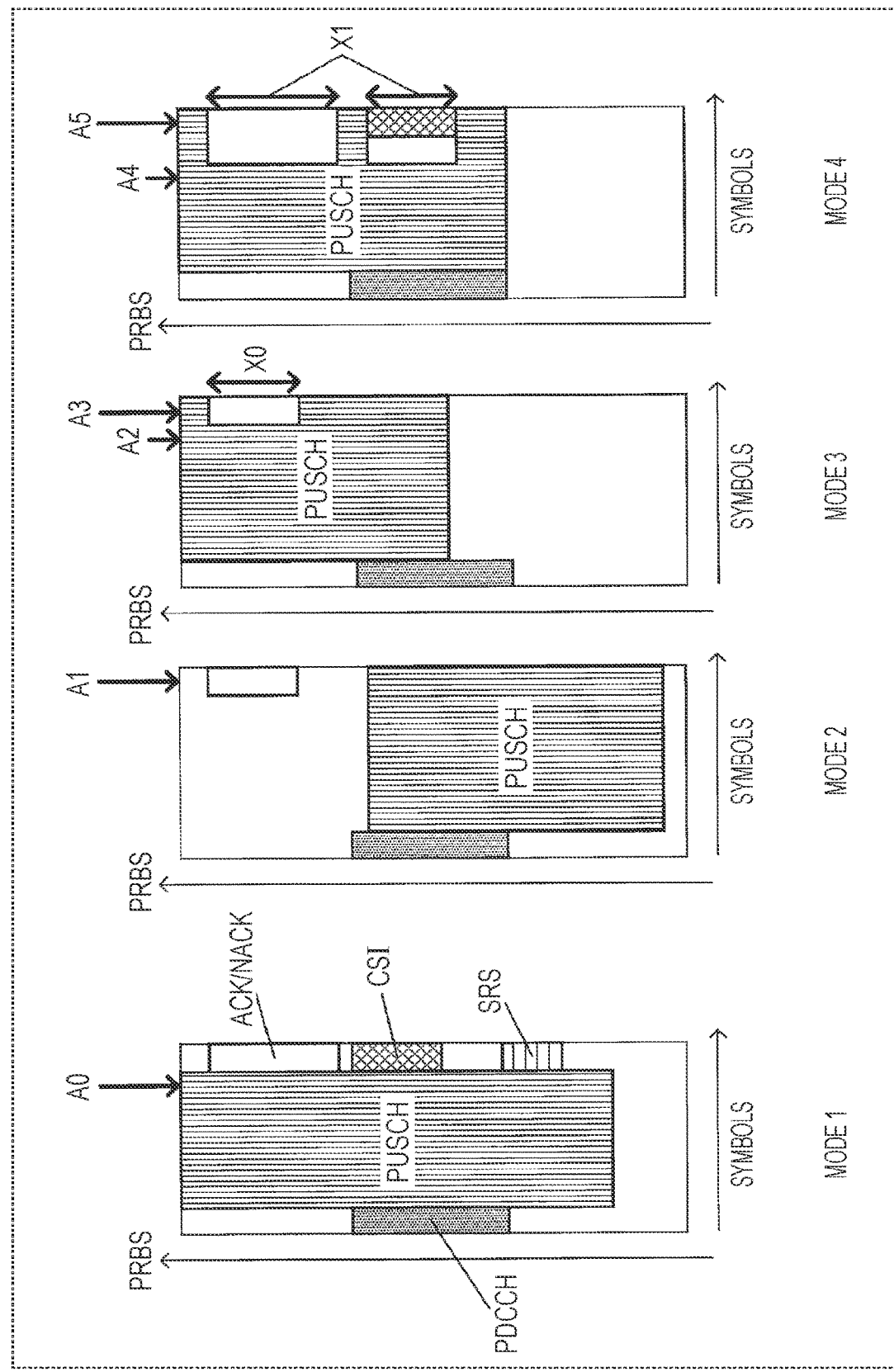

BASE STATION, TERMINAL, AND COMMUNICATION METHOD

TECHNICAL FIELD

The present disclosure relates to base stations, terminals, and communication methods.

BACKGROUND ART

A communication system called a fifth-generation mobile communication system (5G) has been studied. In 5G, it has been studied that functions are flexibly provided for each use case where an increase in communication traffic, an increase in the number of connecting terminals, high reliability, and low latency are each required. As typical use cases, there are three cases, that is, enhanced mobile broadband (eMBB), large-scale communications/many connections (mMTC: massive machine type communications), and ultra reliable and low latency communications (URLLC). In 3GPP (3rd Generation Partnership Project) as an international standardization organization, sophistication of the communication system has been studied from both of sophistication of LTE systems and New RAT (Radio Access Technology) (for example, refer to NPL 1).

CITATION LIST

Non Patent Literature

NPL 1: RP-161596, "Revision of SI: Study on New Radio Access Technology", NTT DOCOMO, September 2016

SUMMARY OF INVENTION

In New RAT, it is required to study a method of providing notification about a data area (for example, symbol position).

One embodiment of the present disclosure facilitates contributing to provision of a base station, terminal, and communication method capable of appropriately providing notification about a data area.

A base station according to one embodiment of the present disclosure includes a circuit which selects one pattern to be used for data allocation from among a plurality of patterns of a resource area where data is allocated, and a transmitter which provides notification about setting information regarding the plurality of patterns by higher-layer signaling and provides notification about the selected one pattern by a downlink control signal (DCI).

A terminal according to one embodiment of the present disclosure includes a receiver which receives higher-layer signaling including setting information regarding a plurality of patterns of a resource area where data is allocated and receives a downlink control signal (DCI) indicating one pattern to be used for data allocation from among the plurality of patterns, and a circuit which specifies a resource where the data is allocated, based on the setting information and the downlink control signal.

A communication method according to one embodiment of the present disclosure includes selecting one pattern to be used for data allocation from among a plurality of patterns of a resource area where data is allocated, and providing notification about setting information regarding the plurality of patterns by higher-layer signaling and providing notification about the selected one pattern by a downlink control signal (DCI).

A communication method according to one embodiment of the present disclosure includes receiving higher-layer signaling including setting information regarding a plurality of patterns of a resource area where data is allocated and receiving a downlink control signal (DCI) indicating one pattern to be used for data allocation from among the plurality of patterns, and determining a resource where the data is allocated, based on the setting information and the downlink control signal.

Note that comprehensive or specific embodiments of these may be implemented as a system, device, method, integrated circuit, computer program, or recording medium or may be implemented in any combination of a system, device, method, integrated circuit, computer program, and recording medium.

According to one embodiment of the present disclosure, notification about the data area can be appropriately provided.

Additional advantages and effects in one embodiment of the present disclosure will become apparent from the specification and the drawings. While these advantages and/or effects are each provided by several embodiments and features described in the specification and the drawings, all are not necessarily required to be provided in order to one or more identical features.

BRIEF DESCRIPTION OF DRAWINGS

FIG. 7 depicts one example of data allocation according to Operation Example 2 of Embodiment 1.

FIG. 10 depicts one example of data allocation according to Embodiment 4.

DESCRIPTION OF EMBODIMENTS

In the following, embodiments of the present disclosure are described in detail with reference to the drawings.

In LTE, a base station dynamically provides notification about the number of symbols in a PDCCH (physical downlink shared channel) area by using a PCFICH (physical control format indicator channel), and data is transmitted from the next symbol in the PDCCH area. Also in LTE, when a start symbol of data is changed to apply CoMP (coordinated multiple point) or for interference control, notification about the start symbol of the data can be provided by signaling of a higher layer.

Meanwhile, in New RAT, it has been studied that notification about the start symbol of the data in a slot is provided by using a DCI (downlink control indicator). What has been studied as the DCI is "group common PDCCH", which is assumed to be simultaneously received by a plurality of terminals (UE: user equipment), and "UE specific DCI", which is assumed to be received by each terminal individually.

However, in New RAT, it has been studied that a "group common control resource set" or "UE specific control resource set", which is an area (control resource set) where a control signal such as a DCI is arranged, is allocated not to all frequency bands but to a part of the frequency bands in the system band. Therefore, a data area (the number of symbols that can be used for data) is different between an area where a control resource set is arranged and an area where a control resource set is not arranged.

While the terminal (user) can recognize an area of the UE specific control resource set allocated to the terminal itself or an area of the group common control resource set to which the terminal itself belongs, the terminal cannot recognize an area of the UE specific control resource set to be allocated to another terminal or an area to be used for other use purpose (for example, such as Sidelink, URLLC, and mMTC). For example, although the base station provides notification about the resource area not to be allocated to the terminal by using signaling of the higher layer and can perform data allocation by avoiding the resource area, allocation is semi-static in notification about the resource area using signaling of the higher layer. In New RAT, since use for a different use purpose for each slot can be thought, there is a problem in that it is not possible to flexibly allocate the resource only with notification by the higher layer.

Thus, a method is described in the following, the method appropriately providing notification about the data area and flexibly allocating the resource in consideration of the area where the control resource set is arranged.

[General Outline of Communication System]

A communication system according to each embodiment of the present disclosure includes a base station 100 and a terminal 200.

Figure 1:
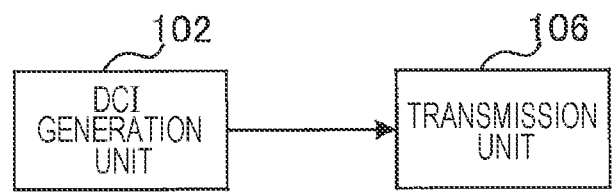
FIG. 1 depicts the structure of a part of a base station according to Embodiment 1.

FIG. 1 is a block diagram depicting the structure of a part of the base station 100 according to an embodiment of the present disclosure. In the base station 100 depicted in FIG. 1, a DCI generation unit 102 selects, from among a plurality of patterns (modes) of a resource area where data is allocated, one pattern for use in data allocation. A transmission unit 106 provides notification about setting information regarding the plurality of patterns by higher-layer signaling, and provides notification about the selected one pattern by a downlink control signal (DCI).

Figure 2:
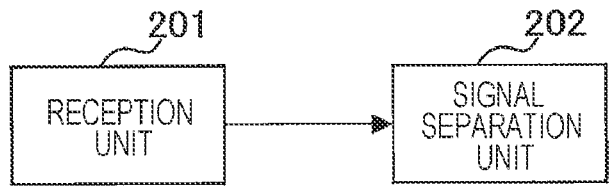
FIG. 2 depicts the structure of a part of a terminal according to Embodiment 1.

FIG. 2 is a block diagram depicting the structure of a part of the terminal 200 according to the embodiment of the present disclosure. In the terminal 200 depicted in FIG. 2, a reception unit 201 receives signaling of the higher layer including the setting information regarding the plurality of patterns (modes) of the resource area where data is allocated, and receives the downlink control information (DCI) indicating one pattern for use in data allocation from among the plurality of patterns. A signal separation unit 202 specifies a resource where data is allocated, based on the setting information and the downlink control signal.

Embodiment 1

[Structure of Base Station]

Figure 3:
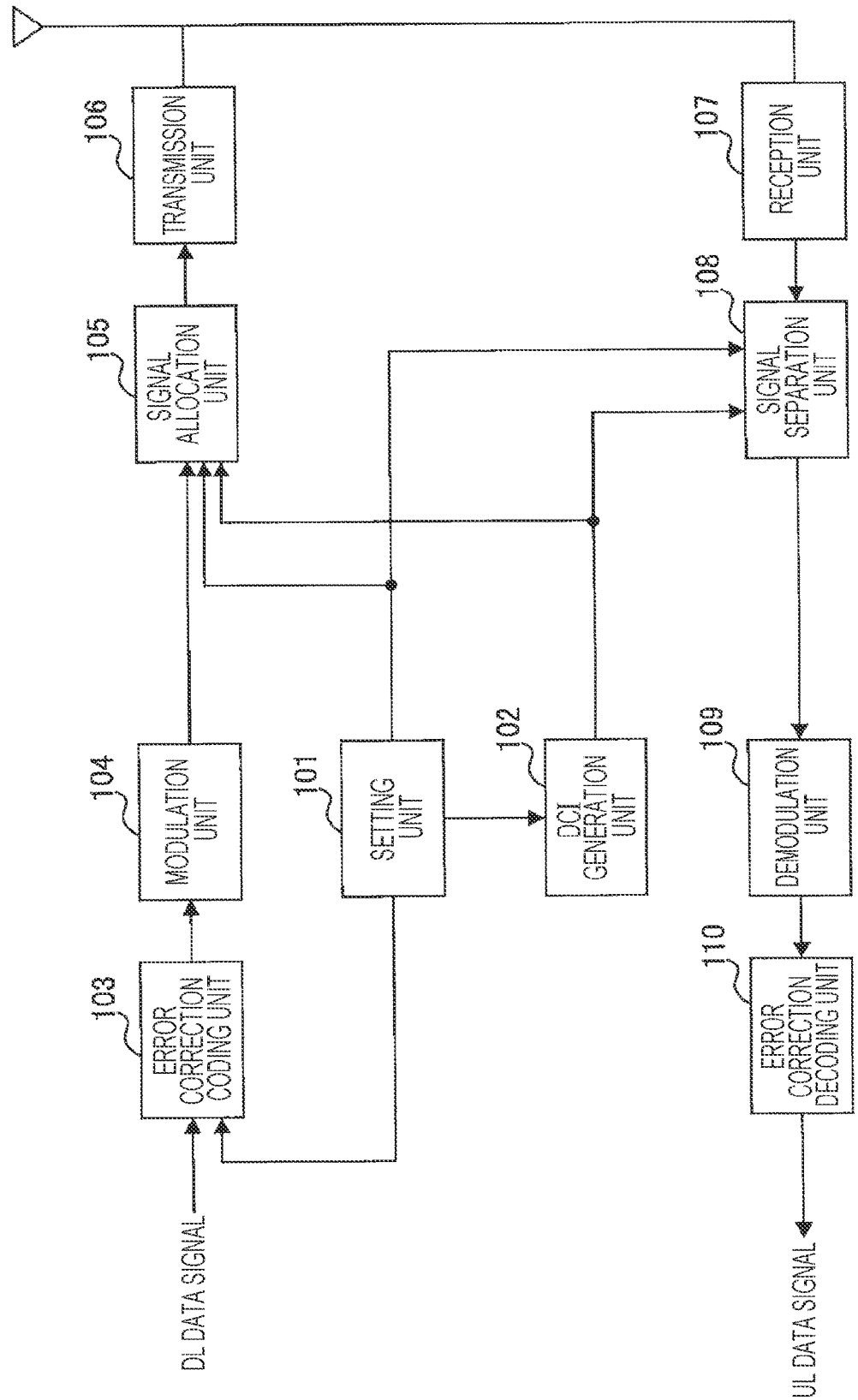
FIG. 3 depicts the structure of the base station according to Embodiment 1.

FIG. 3 is a block diagram depicting the structure of the base station 100 according to the present embodiment. In FIG. 3, the base station 100 has a setting unit 101, the DCI generation unit 102, an error correction coding unit 103, a modulation unit 104, a signal allocation unit 105, the transmission unit 106, a reception unit 107, a signal separation unit 108, a demodulation unit 109, and an error correction decoding unit 110.

The setting unit 101 sets a plurality of patterns (hereinafter referred to as "modes") of a resource area where data is allocated and parameters regarding the resource area where data is allocated in the plurality of modes. For example, the setting unit 101 sets a frequency domain (for example, PRB (physical resource block)) and a time domain (for example, symbol) of a resource candidate to be excluded from data allocation. Then, the setting unit 101 generates signaling of a higher layer (SIB (system information block) or dedicated RRC (radio resource control)) including setting information regarding the plurality of modes (for example, parameters indicating the above frequency domain and time domain). The setting unit 101 outputs the signaling of the higher layer to the error correction coding unit 103, and outputs the setting information to the DCI generation unit 102, the signal allocation unit 105, and the signal separation unit 108.

The DCI generation unit 102 selects (determines), for example, based on information (not depicted) such as a control signal amount or data amount per slot, one mode to be used for data allocation for the terminal 200 from among the plurality of modes set in the setting unit 101, and generates bit information corresponding to the selected mode.

The DCI generation unit 102 generates resource allocation information of a DL (downlink) data signal or UL (uplink) data signal (DL allocation information or UL allocation information) and downlink control signal (DCI) including the bit information corresponding to the selected mode, and outputs the DCI to the signal allocation unit 105. Also, of the generated DCI, the DCI generation unit 102 outputs the DL allocation information to the signal allocation unit 105 and outputs the UL allocation information to the signal separation unit 108.

The error correction coding unit 103 performs error correction coding on the transmission data signal (DL data signal) and the signaling of the higher layer (setting information) inputted from the setting unit 101, and outputs the signal after coding to the modulation unit 104.

The modulation unit 104 performs modulation process on the signal received from the error correction coding unit 103, and outputs the signal after modulation to the signal allocation unit 105.

The signal allocation unit 105 allocates, based on the DL allocation information inputted from the DCI generation unit 102, the DL data signal and the setting information received from the modulation unit 104 or the DCI, which is a control signal, received from the DCI generation unit 102 to a downlink resource. Specifically, the signal allocation unit 105 allocates the DL data signal to a resource other than a resource to be excluded from data allocation by following the mode (mode selected in the DCI generation unit 102) indicated by the DCI inputted from the DCI generation unit 102 among the plurality of modes set in the setting unit 101. In this manner, a transmission signal is formed. The formed transmission signal is outputted to the transmission unit 106.

The transmission unit 106 performs wireless transmission process such as up-conversion on the transmission signal inputted from the signal allocation unit 105 for transmission via an antenna to the terminal 200.

The reception unit 107 receives the signal transmitted from the terminal 200 via the antenna, and performs wireless reception process such as down-conversion on the reception signal for output to the signal separation unit 108.

The signal separation unit 108 separates the UL data signal from the reception signal received from the reception unit 107, based on the information inputted from the DCI generation unit 102 (bit information corresponding to the mode and UL allocation information) and setting information inputted from the setting unit 101. Specifically, the signal separation unit 108 specifies the resource excluded from allocation of the UL data signal by following the mode indicated by the DCI inputted from the DCI generation unit 102 (mode selected in the DCI generation unit 102) among the plurality of modes set in the setting unit 101, and separate a signal arranged to a resource other than the resource to be excluded from data allocation for output to the demodulation unit 109.

The demodulation unit 109 performs demodulation process on the signal inputted from the signal separation unit 108, and outputs the acquired signal to the error correction decoding unit 110.

The error correction decoding unit 110 decodes the signal inputted from the demodulation unit 109 to acquire a reception data signal (UL data signal) from the terminal 200.

[Structure of Terminal]

Figure 4:
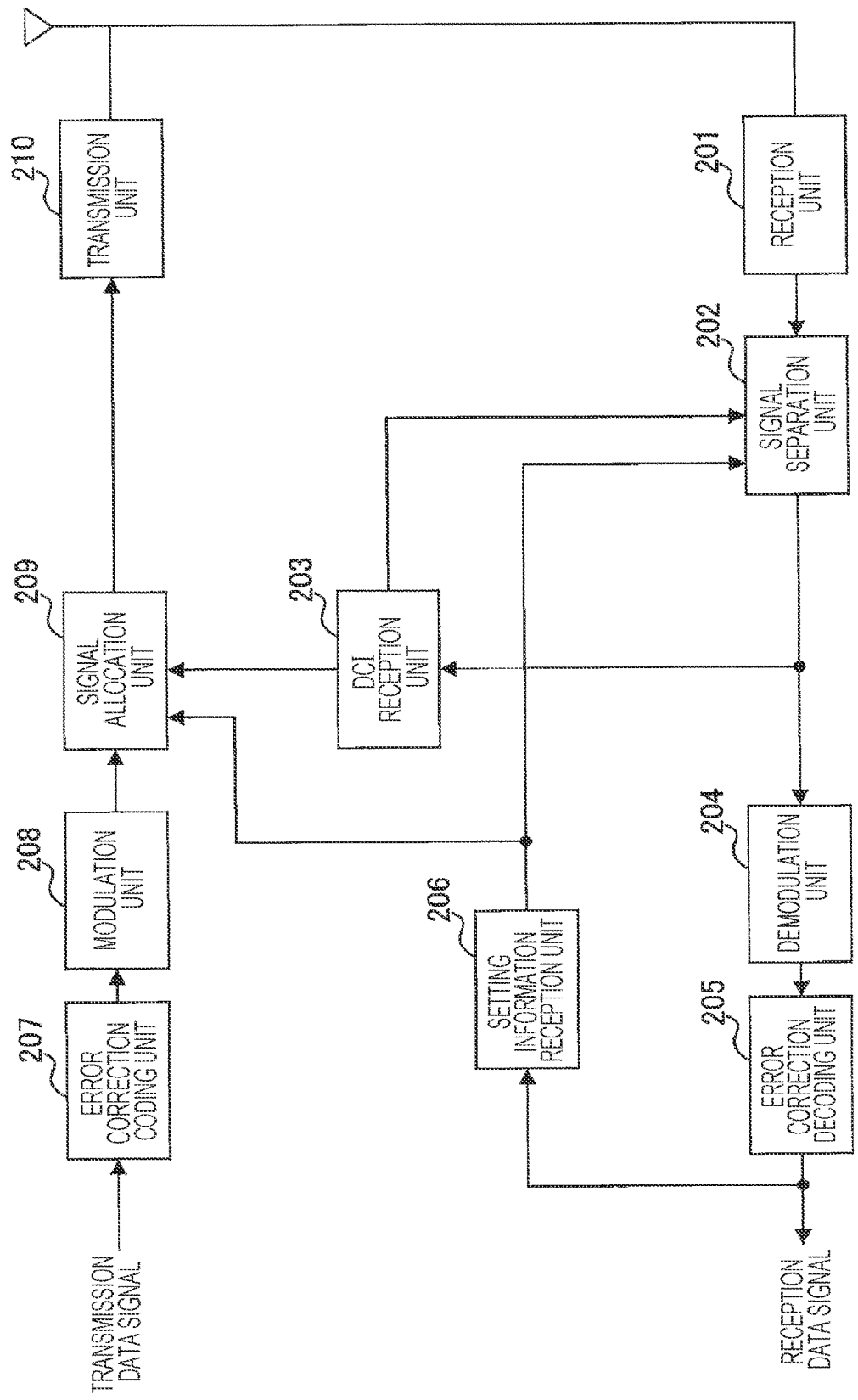
FIG. 4 depicts the structure of the terminal according to Embodiment 1.

FIG. 4 is a block diagram depicting the structure of the terminal 200 according to the present embodiment. In FIG. 4, the terminal 200 has the reception unit 201, the signal separation unit 202, a DCI reception unit 203, a demodulation unit 204, an error correction decoding unit 205, a setting information reception unit 206, an error correction coding unit 207, a modulation unit 208, a signal allocation unit 209, and a transmission unit 210.

The reception unit 201 receives a reception signal via an antenna, performs reception process such as down-conversion on the reception signal, and then outputs the resultant signal to the signal separation unit 202. The reception signal includes, for example, higher-layer signaling (including setting information), DCI (including bit information corresponding to the mode selected in the base station 100), or the like.

The signal separation unit 202 separates, from the reception signal received from the reception unit 201, a signal arranged to a resource where there is a possibility in which the DCI is allocated, and outputs the resultant signal to the DCI reception unit 203. Also, the signal separation unit 202 specifies a resource excluded from allocation of the DL data signal, based on the information inputted from the DCI reception unit 203 (bit information corresponding to the mode selected in the base station 100 and DL allocation information) and the information inputted from the setting information reception unit 206 to specify a resource where the DL data signal is allocated. Then, the signal separation unit 202 separates the DL data signal or the signaling of the higher layer from the reception signal for output to the demodulation unit 204.

The DCI reception unit 203 tries to decode the signal of the resource where there is a possibility in which the DCI inputted from the signal separation unit 202 is allocated to detect (receive) the DCI. The DCI reception unit 203 outputs the UL allocation information indicated in the received DCI to the signal allocation unit 209, and outputs the DL allocation information to the signal separation unit 202. Also, the DCI reception unit 203 outputs the bit information corresponding to the mode included in the DCI (mode selected in the base station 100) to the signal separation unit 202.

The demodulation unit 204 demodulates the signal inputted from the signal separation unit 202, and outputs the signal after demodulation to the error correction decoding unit 205.

The error correction decoding unit 205 decodes the demodulated signal received from the demodulation unit 204, outputs the acquired reception data signal, and outputs the acquired signaling of the higher layer to the setting information reception unit 206.

The setting information reception unit 206 specifies parameters indicating a frequency domain and a time domain of a resource candidate to be excluded from data allocation in the plurality of modes regarding data allocation, based on the setting information included in the signaling of the higher layer outputted from the error correction decoding unit 205. Then, the setting information reception unit 206 outputs the parameters regarding the plurality of modes to the signal separation unit 202 and the signal allocation unit 209.

The error correction coding unit 207 performs error correction coding on the transmission data signal (UL data signal), and outputs the data signal after coding to the modulation unit 208.

The modulation unit 208 modulates the data signal inputted from the error correction coding unit 207, and outputs the data signal after modulation to the signal allocation unit 209.

The signal allocation unit 209 specifies the resource to be excluded from allocation of the UL data, based on the UL allocation information inputted from the DCI reception unit 203, the bit information corresponding to the mode (mode selected in the base station 100), and the information inputted from the setting information reception unit 206 (parameters regarding the plurality of modes) to specify a resource where the UL data is allocated. Then, the signal allocation unit 209 allocates the data signal inputted from the modulation unit 208 to the specified resource for output to the transmission unit 210.

The transmission unit 210 performs transmission process such as up-conversion on the signal inputted from the signal allocation unit 209 for transmission via the antenna.

[Operation of Base Station 100 and Terminal 200]

Operations in the base station 100 and the terminal 200 having the above-described structures are described in detail.

Figure 5:
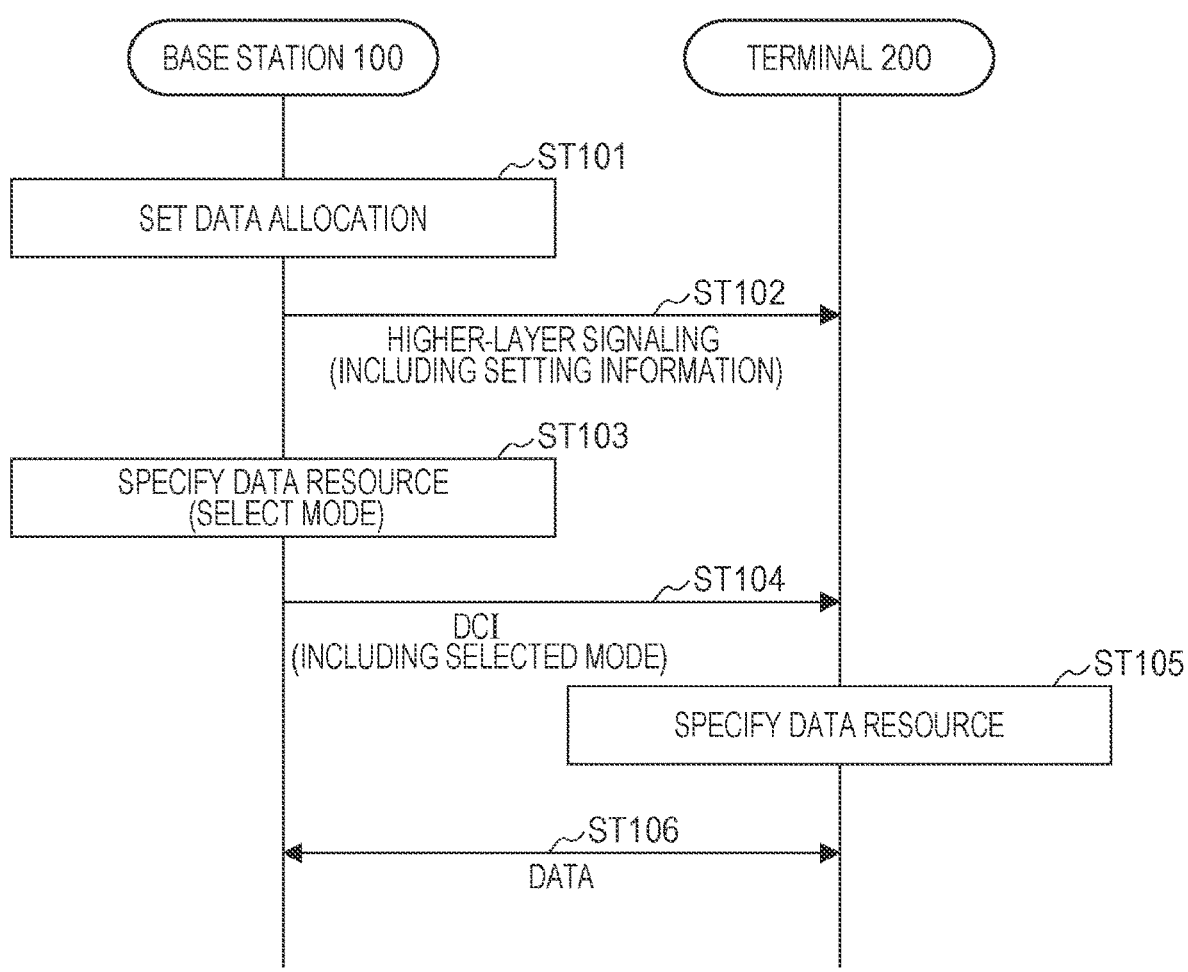
FIG. 5 depicts an operation example of the base station and the terminal according to Embodiment 1.

FIG. 5 is a sequence diagram depicting the operation of the base station 100 and the terminal 200.

The base station 100 sets data allocation, that is, sets a plurality of modes (patterns) in a frequency domain or time domain regarding data allocation (ST101). The frequency domain or time domain in each mode indicates, for example, a frequency domain or time domain of a resource candidate to be excluded from data allocation.

The base station 100 transmits the set setting information regarding the plurality of modes (parameters indicating the frequency domain or time domain) to the terminal 200 by using signaling of a higher layer (SIB or dedicated RRC) (ST102).

Next, the base station 100 selects one mode from among the plurality of modes set at ST101 at the time of data allocation, and specifies a resource area usable for allocation of data based on the selected mode (ST103). For example, the base station 100 may specify a resource area usable for allocation of data for each PRB.

Then, the base station 100 transmits allocation information of data (DL data signal or UL data signal) and the DCI including the selected mode to the terminal 200 (ST104).

Meanwhile, the terminal 200 specifies a resource area usable for allocation of data, based on the setting information (frequency domain and time domain) including the signaling of the higher layer received at ST102 and the DCI received at ST104 (ST105). For example, the terminal 200 may specify a resource area usable for data allocation for each PRB. Specifically, the terminal 200 selects one mode, notification of which is provided by the DCI, from among the plurality of modes and, by using the setting information regarding the selected mode, specifies a resource area to be excluded from data allocation, that is, a resource area usable for data allocation.

Then, the base station 100 and the terminal 200 transmit and receive data (DL data signal or UL data signal) by using the specified resource (ST106).

In this manner, in the present embodiment, when providing notification about allocation information of data, the base station 100 provides notification by the setting information (parameters indicating a frequency domain or time domain) regarding the plurality of modes (patterns) for data allocation by higher-layer signaling, and provides notification about one mode (pattern) to be used for actual data allocation by the DCI. That is, notification about data allocation is provided by using the signaling of the higher layer and the DCI together.

With this, the base station 100 is only required to provide notification about one mode (bit information) by the DCI at the time of data allocation, and is not required to provide notification about the setting information regarding the frequency domain or the time domain for every data allocation. Thus, while overhead of signaling of the DCI is reduced, an area to be used for anything other than data can be excluded from the data area. Also, since the base station 100 can dynamically change the mode to be used for data allocation from among the plurality of modes by the DCI, data can be flexibly allocated.

Next, Operation Examples 1 and 2 according to the present embodiment are described.

Operation Example 1

Figure 6A:
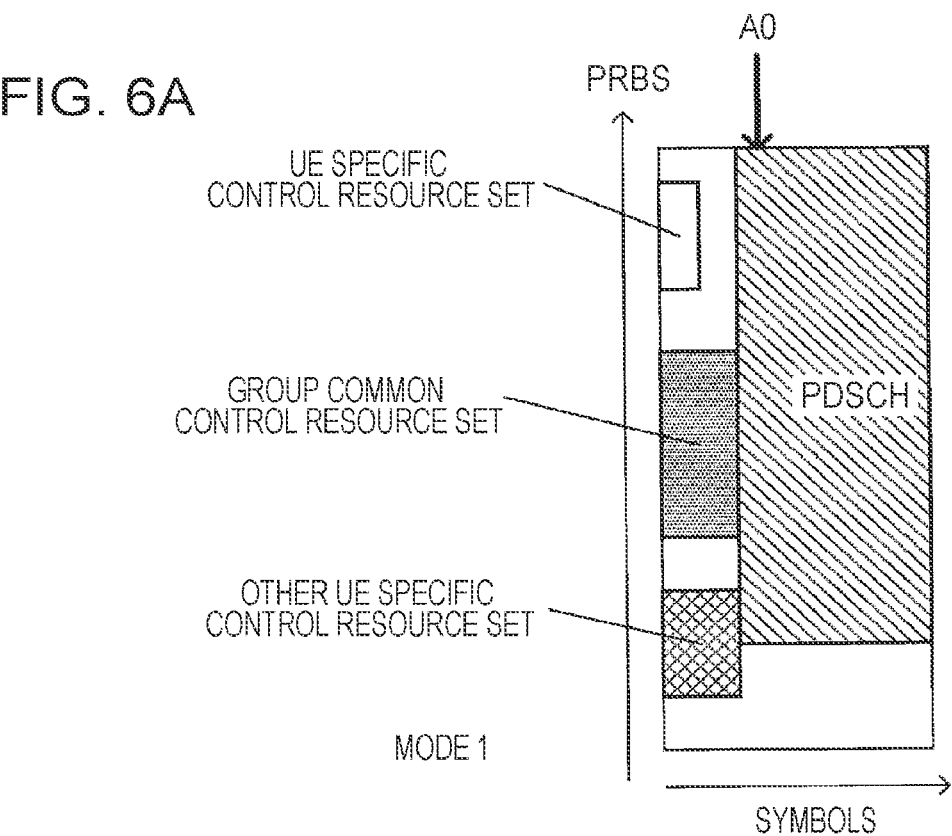
FIG. 6A depicts one example of data allocation according to Operation Example 1 of Embodiment 1.
Figure 6B:
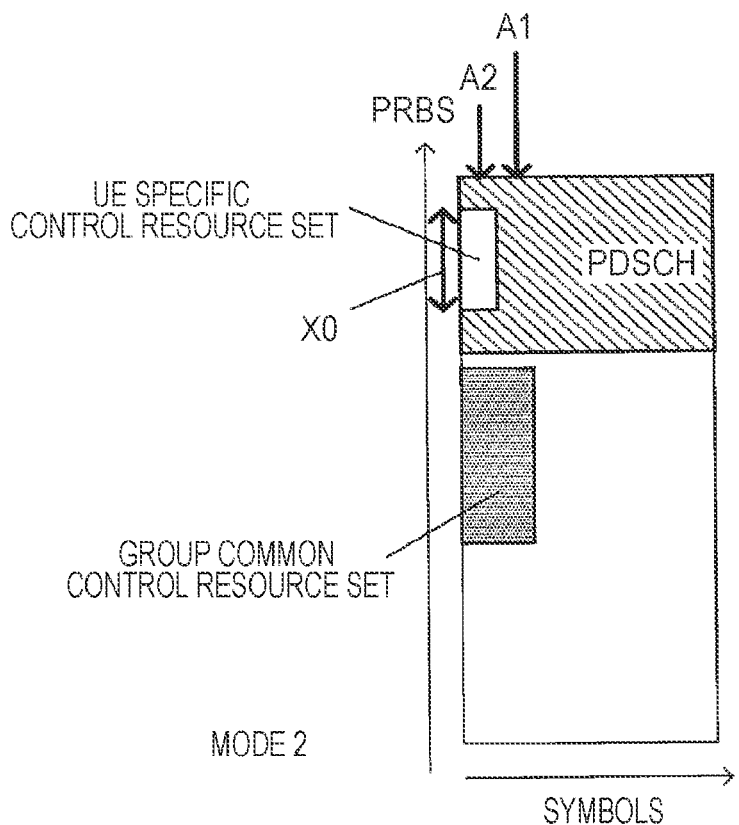
FIG. 6B depicts one example of data allocation according to Operation Example 1 of Embodiment 1.

The base station 100 sets, for example, "Mode 1" depicted in FIG. 6A and "Mode 2" depicted in FIG. 6B, as modes of data allocation. Also, as setting information regarding Mode 1 and Mode 2, the base station 100 provides notification about a frequency domain "X0" and start symbols "A0", "A1", and "A2", which are symbols for starting allocation of data, by using signaling of a higher layer. Here, as will be described further below, A0 is a parameter regarding Mode 1, and X0, A1, and A2 are parameters regarding Mode 2. The frequency domain X0 may be represented by, for example, a PRB number or RBG number.

Also, the base station 100 notifies the terminal 200 of Mode 1 or Mode 2 as a mode to be used for data allocation, by using one bit included in the DCI.

The terminal 200 specifies a resource area where data is allocated, based on the information corresponding to the mode indicated in the DCI of the setting information regarding Mode 1 and Mode 2, notification of which is provided by the signaling of the higher layer.

Here, in each mode, for example, data is allocated as follows.

Mode 1: Data is allocated from the symbol A0.

Mode 2: In the frequency domain X0, data is allocated from the symbol A1. In a frequency domain other than X0, data is allocated from the symbol A2.

Also, {X0, A0, A1, A2}, notification of which is provided by the signaling of the higher layer as setting information, may be set as follows.

Frequency domain X0: The same frequency domain as that of the UE specific control resource set A0: A symbol subsequent to a symbol where the group common control resource set is arranged A1: A symbol subsequent to a symbol where the UE specific control resource set is arranged A2: Symbol #0

That is, regarding Mode 1, A0 indicates a start position (start symbol) of a time domain where the DL data signal is allocated.

Also, regarding Mode 2, X0 indicates a frequency domain where a DL control signal (for example, such as UE specific DCI) is allocated, A1 indicates a start position of a time domain where the DL data signal is allocated in the frequency domain X0, and A2 indicates a start position of a time domain where the DL data signal is allocated in a frequency domain other than the frequency domain X0.

That is, in Mode 1, as depicted in FIG. 6A, irrespective of the data resource (resource indicated in the DL allocation information) where data (PDSCH) is allocated, the terminal 200 specifies a start position of a symbol where data (PDSCH) is allocated, based on the start symbol (A0), notification of which is provided by the signaling of the higher layer. That is, in Mode 1, data is allocated from the symbol A0 in the entire band of the data resource.

Therefore, even if both of the UE specific control resource set and the group common control resource set and the data resource overlap each other in the frequency domain or if the UE specific control resource set dedicated for another terminal and the data resource overlap each other in the frequency domain, data for the terminal 200 can be arranged by avoiding these control signal areas.

Also, Mode 1 is effective as well when an interference with a first-half symbol (for example, a symbol before the symbol A0) is reduced in ICIC (inter cell interference coordination).

Meanwhile, in Mode 2, as depicted in FIG. 6B, the terminal 200 specifies a resource where data (PDSCH) is allocated, based on the frequency domain (X0) and the start symbols (A1, A2), notification of which is provided by the signaling of the higher layer. That is, in Mode 2, the start position of the symbol where data is allocated is different between the frequency domain X0 and a domain other than the frequency domain X0.

Therefore, Mode 2 is effective when, for example, as depicted in FIG. 6B, the data resource and the frequency domain X0 (UE specific control resource set) overlap each other. Specifically, of the data resource for the terminal 200, data can be arranged in the frequency domain X0 by avoiding the UE specific control resource set, and data can be arranged from the symbol #0 (A2) in the domain other than the frequency domain X0. This allows the resource to be effectively used.

Note that while the case has been described in the above example in which the frequency domain X0 is the same frequency domain as the UE specific control resource set, the frequency domain X0 may be the same area as the group common control resource set, or may be a frequency domain with the UE specific control resource set and the group common control resource set added together. When the frequency domain X0 is the same area as the UE specific control resource set or the group common control resource set, the signaling of the higher layer can be reduced.

Also, notification about the frequency domain X0 may be provided in PRB units or RBG (resource block group) units. When notification about the frequency domain X0 is provided in PRB units or RBG units, the base station 100 can more flexibly instruct the terminal 200 on the resource, and it is thus possible to avoid an area of the control resource set to be allocated to another terminal or avoid an area to be used for another use purpose.

Also, the start symbol A0 is not limited to a symbol subsequent to the group common control resource set, and may be, for example, a symbol subsequent to a symbol arranged backmost of a control signal channel. Also, the start symbols A0, A1, and A2 may be symbols subsequent to a symbol where the group common control resource set or the group common control resource is arranged, and notification about a symbol number may be provided. Also, A0 and A2 may have the same value, and A1 and A2 may have the same value.

Operation Example 2

In Operation Example 1, the case has been described in which two modes (Mode 1 and Mode 2) are prepared by using signaling of a higher layer and switching is made between Mode 1 and Mode 2 by using one bit included in the DCI. By contrast, in Operation Example 2, the case is described in which four modes (Mode 1, Mode 2, Mode 3, and Mode 4) are prepared by signaling of a higher layer and switching is made among Mode 1, Mode 2, Mode 3, and Mode 4 by using two bits included in the DCI.

FIG. 7 depicts one example of Mode 1, Mode 2, Mode 3, and Mode 4 according to Operation Example 2.

Specifically, the base station 100 sets, for example, Mode 1 to Mode 4 depicted in FIG. 7 as modes of data allocation. Also, as setting information regarding Mode 1 to Mode 4, the base station 100 provides notification about frequency domains "X0" and "X1" and start symbols "A0", "A1", "A2", "A3", "A4", and "A5" of data by using signaling of a higher layer. Here, as will be described further below, A0 is a parameter regarding Mode 1; A1 is a parameter regarding Mode 2; X0, A2, and A3 are parameters regarding Mode 3; and X1, A4, and A5 are parameters regarding Mode 4. The frequency domains X0 and X1 may be represented by, for example, PRB numbers or RBG numbers.

Also, by using two bits included in the DCI, the base station 100 notifies the terminal 200 of any one mode, that is, Mode 1, Mode 2, Mode 3, or Mode 4, as a mode to be used for data allocation.

The terminal 200 specifies a resource area where data is allocated, based on information corresponding to the mode indicated in the DCI of the setting information regarding Mode 1 to Mode 4, notification of which is provided by the signaling of the higher layer.

Here, in each mode, for example, data is allocated as follows.

Mode 1: Data is allocated from the symbol A0.
Mode 2: Data is allocated from the symbol A1.
Mode 3: Data is allocated from the symbol A2 in the frequency domain X0, and data is allocated from the symbol A3 in a frequency domain other than X0.
Mode 4: Data is allocated from the symbol A4 in the frequency domain X1, and data is allocated from the symbol A5 in a frequency domain other than X1.

Also, {X0, X1, A0, A1, A2, A3, A4, A5}, notification of which is provided by the signaling of the higher layer as setting information, may be set as follows.

Frequency domain X0: The same frequency domain as the UE specific control resource set
Frequency domain X1: A frequency domain with the UE specific control resource set and the group common control resource set added together
A0: A symbol subsequent to a symbol where the group common control resource set is arranged
A1: Symbol #0
A2: A symbol subsequent to a symbol where the UE specific control resource set is arranged
A3: Symbol #0
A4: A symbol subsequent to a symbol where the group common control resource set or the UE specific control resource set is arranged
A5: Symbol #0

That is, regarding Mode 1, A0 indicates a start position (start symbol) of a time domain where the DL data signal is allocated.

Also, regarding Mode 2, A1 indicates a start position (start symbol) of a time domain where the DL data signal is allocated.

Also, regarding Mode 3, X0 indicates a frequency domain where a DL control signal (for example, such as UE specific DCI) is allocated, A2 indicates a start position of a time domain where the DL data signal is allocated in the frequency domain X0, and A3 indicates a start position of a time domain where the DL data signal is allocated in a frequency domain other than the frequency domain X0.

Also, regarding Mode 4, X1 indicates a frequency domain where a DL control signal (for example, such as UE specific DCI or group common PDCCH) is allocated, A4 indicates a start position of a time domain where the DL data signal is allocated in the frequency domain X1, and A5 indicates a start position of a time domain where the DL data signal is allocated in a frequency domain other than the frequency domain X1.

Operation in Mode 1 of FIG. 7 is similar to that in Mode 1 of Operation Example 1 (FIG. 6A). That is, in Mode 1, as depicted in FIG. 7, irrespective of the data resource (resource indicated in the DL allocation information) where data (PDSCH) is allocated, the terminal 200 specifies a start position of a symbol where data (PDSCH) is allocated, based on the start symbol (A0), notification of which is provided by the signaling of the higher layer. That is, in Mode 1, data is allocated from the symbol A0 in the entire band of the data resource.

In Mode 2, data allocation starts from a symbol (symbol #0 in FIG. 7) different from that of Mode 1. That is, in Mode 2, as depicted in FIG. 7, data (PDSCH) is allocated from the symbol #0, irrespective of the data resource. In this manner, since data is allocated from the symbol #0 in Mode 2, Mode 2 is effective when, for example, data is allocated to a frequency domain not overlapping the control resource set for the terminal 200.

In Mode 3, as with Mode 2 of Operation Example 1 (FIG. 6B), the start symbol where data is allocated is different between the frequency domain X0 and a domain other than the frequency domain X0. In Mode 3, data for the terminal 200 can be arranged in the frequency domain X0 by avoiding the UE specific control resource set, and data can be arranged from the symbol #0 in the domain other than the frequency domain X0. This allows the resource to be effectively used. In this manner, Mode 3 of FIG. 7 is effective when data is allocated in a frequency domain overlapping the frequency domain X0 (UE specific control resource set).

In Mode 4, as with Mode 3, the start symbol where data is allocated is different between the frequency domain X1 and a domain other than the frequency domain X1. In Mode 4, data for the terminal 200 can be arranged in the domain of the frequency domain X1 by avoiding the control signal, and data for the terminal 200 can be arranged from the symbol #0 in the domain other than the frequency domain X1. This allows the resource to be effectively used. In this manner, Mode 4 of FIG. 7 is effective when data is allocated in a frequency domain overlapping the frequency domain X1 (UE specific control resource set and group common control resource set). However, when the number of symbols of the UE specific control resource set is different from that of the group common control resource set, A4 is required to be set in accordance with the one with a larger number of symbols.

Note that the frequency domains X0 and X1 each may the same frequency domain as the UE specific control resource set or the same area as the group common control resource set, or each may be a frequency domain with the UE specific control resource set and the group common control resource set added together. When the frequency domains X0 and X1 each are the same area as the UE specific control resource set or the group common control resource set, the signaling of the higher layer can be reduced.

Also, notification about the frequency domains X0 and X1 may be provided in PRB units or RBG units. When notification about the frequency domains X0 and X1 is provided in PRB units or RBG units, the base station 100 can more flexibly instruct the terminal 200 on the resource, and it is thus possible to avoid the frequency domain of the control resource set to be allocated to another mobile station or avoid an area to be used for another use purpose.

Also, the start symbol A0 is not limited to a symbol subsequent to the group common control resource set, and may be, for example, a symbol subsequent to a symbol arranged backmost of a control signal channel. Also, A0, A1, A2, A3, and A5 may be symbols subsequent to a symbol where the group common control resource set or the group common control resource is arranged, and notification about a symbol number may be provided. Also, A0, A1, A3, and A5 may be the symbol #0. Alternatively, A0, A2, and A4 may have the same value, and A1, A3, and A5 may have the same value.

In the foregoing, Operation Examples 1 and 2 have been described. For example, it is only required that the base station 100 selects one mode suitable for an allocation resource of DL data from among the plurality of modes, based on a relation between the allocation resource (data resource) of the DL data signal (PDSCH) and the allocation resource of the control signal (control resource set) (for example, such as the presence or absence of overlap).

In this manner, in the present embodiment, the base station 100 provides notification about the setting information regarding the plurality of modes of the resource area where data is allocated (for example, such as X0, X1, A0, A1, A2, A3, A4, and A5) by higher-layer signaling. Also, the base station 100 selects one mode to be used for data allocation from among the plurality of modes, and provides notification about the selected one pattern by the DCI. The terminal 200 specifies a resource by using a parameter corresponding to the mode, notification of which is provided by the DCI, from the setting information, notification of which has already been provided by higher-layer signaling.

With this, the base station 100 notifies the terminal 200 of the mode by the DCI, thereby allowing dynamic resource allocation in consideration of use for a different use purpose for each slot. Also, the base station 100 is only required to provide notification about the mode by using the DCI when changing resource allocation, and is not required to provide notification about the resource (for example, such as the symbol start position of data for each frequency domain) every time resource allocation is changed, thereby allowing reduction in DCI signaling overhead.

Also, the base station 100 selects the mode in accordance with the resource (control resource set) where the control signal channel is arranged, thereby allowing flexible data allocation to be performed by avoiding a resource area not allocated for the terminal 200 in each slot.

Thus, according to the present embodiment, notification about the data area (data start position) can be appropriately provided in consideration with an area where the control resource set is arranged, and the resource can be flexibly allocated.

Note that when the area of the group common control resource set or the UE specific control resource set is dynamically changed by the control signal indicating the structure of a slot called group common PDCCH, the frequency domain such as X0 and X1 may follow the area indicated by group common PDCCH.

Also, the frequency domains such as X0 and X1 and the time domains such as A2 and A4 may be variable by PDCCH detected by the terminal 200. For example, X0 may be the same frequency domain as PDCCH (DL allocation or UL allocation, or both thereof) detected by the terminal 200 in the UE specific control resource set, and A2 may be a time domain of PDCCH detected by the terminal 200. This allows only the resource used for PDCCH transmission to be excluded from data allocation in the UE specific control resource set, and allows a resource not used for PDCCH transmission to be used for data allocation. Here, X1 is the entire common control resource set or the entire UE specific control resource set, or the entirety of both thereof and, by switching to Mode 3 or Mode 4, switching can be made such that a portion of UE specific control resource set can be used for data or the entirety cannot be used for data.

Also, in the above operation examples, the case has been described in which the mode (Mode 3, Mode 4) in which the frequency domain X0 or X1 is used and the mode (Mode 1, Mode 2) in which X0 and X1 are not used are prepared on halves. However, the operation is not limited to this. The base station 100 may set all modes as a mode in which the frequency domain X0 or X1 is used, and may set all modes as a mode in which the frequency domains X0 and X1 are not used. In the case of the mode in which all modes use a frequency domain, flexibility of data allocation is improved. In the case of the mode in which all modes do not use a frequency domain, the operation becomes simple and, in particular, suitable for the case in which ICIC or CoMP is assumed.

Embodiment 2

In Embodiment 1, the case has been described in which notification about the data start position (start symbol) in the time domain is provided. In the present embodiment, the case is described in which notification about a symbol (for example, symbol number) or frequency band (for example, PRB) to be used as a data area in the time domain or frequency domain is provided.

Note that the basic structures are common between a base station and a terminal according to the present embodiment and the base station 100 and the terminal 200 according to Embodiment 1 and description is thus made by citing FIG. 3 and FIG. 4.

In the following, by way of example, one slot is configured of seven symbols. Also, as a state (type) of each symbol, it is assumed that there are three states, that is, a DL symbol, a UL symbol, and a symbol for another use purpose. In this case, as for seven symbols in one slot, to provide notification about all state patterns, the number of bits for notification about patterns as many as the seventh power of 3 (2187) is required, and there is a problem of large overhead if notification about the entire information is provided by the DCI.

Thus, in the present embodiment, the base station 100 first provides notification about setting information indicating a plurality of patterns of the symbol structure or the structure of frequency bands in a slot configured of a DL symbol, a UL symbol, or a symbol to be used for another use purpose, by using signaling of a higher layer (SIB or dedicated RRC). Then, the base station 100 selects one pattern from among the plurality of patterns, and specifies a resource area (for example, symbol, PRB units) usable for allocation of data based on the selected pattern. Also, the base station notifies the terminal 200 of the selected pattern by the DCI.

Meanwhile, the terminal 200 receives a plurality of patterns indicating the symbol structure or the structure of frequency bands in the slot by the signaling of the higher layer. Then, the terminal 200 selects one pattern, notification of which is provided by the DCI, from among the plurality of patterns, and specifies a resource area (for example, symbol, PRB units) usable for data allocation.

With this, the base station 100 is only required to provide notification about one pattern indicating the symbol structure or frequency band by the DCI at the time of data allocation, and is not required to provide notification about a resource to be used as a data area in the time domain or frequency domain for every data allocation. Thus, overhead of signaling of the DCI can be reduced. Also, since the base station 100 can dynamically change the resource structure in the slot by the DCI, data can be flexibly allocated.

Next, Operation Examples 1 and 2 according to the present embodiment are described.

Operation Example 1

In Operation Example 1, operation of providing notification about a symbol in a slot is described.

The base station 100 provides notification about the structure of the DL symbol, the UL symbol, and the symbol for another use purpose in one slot or a plurality of slots, by using the signaling of the higher layer. In the following, the number of symbols in a slot is assumed to be seven. The base station 100 selects, as one example of the signaling of the higher layer, four patterns among the following patterns (a) to (g).

Notification for each slot:
(a) All seven symbols are DL symbols.
(b) Six symbols are DL symbols, and one symbol is a UL symbol.
(Mainly used for DL data transmission, and UL is used for control signal transmission)
(c) Five symbols are DL symbols, and two symbols are UL symbols.

(Mainly used for DL data transmission, and UL is used for control signal transmission)
(d) Two symbols are DL symbols, and five symbols are UL symbols.
(Mainly used for UL data transmission, and DL is used for control signal transmission)
(e) One symbol is a DL symbol, and six symbols are UL symbols.
(Mainly used for UL data transmission, and DL is used for control signal transmission)
(f) Four symbols are DL symbols, and three symbols are symbols to be used for another use purpose.
(A first-half is used for DL data transmission, and a second-half is a mini slot or Sidelink)
(g) One symbol is a DL symbol, and six symbols are symbols to be used for another use purpose.
(Mainly Used for Other Data Transmission, and DL is Used for Control Signal Transmission)

Notification for each of the plurality of slots:
As a pattern of the plurality of slots, the base station 100 may provide notification by combining a plurality of those of the patterns (a) to (g) for each slot.

For example, when the base station 100 provides notification about patterns for two slots in a collective manner, in the case of the patterns (a) and (a), all fourteen symbols in two slots are DL symbols. Also, in the case of notification for every two slots, the terminal 200 may monitor the DCI for every two slots.

Also, in the case of notification for each of the plurality of slots, the following patterns (h) and (i) in one slot may be added, and the base station 100 may select four patterns from among the patterns (a) to (i).
(h) All seven symbols are UL symbols.
(i) All seven symbols are symbols to be used for another use purpose.

By using the signaling of the higher layer, notification about a pattern in a further long period may be provided. The long period may include, for example, notification equivalent to DL, UL, and special subframe in subframe (1 msec) unit, notification of which is provided as DL/UL configuration in LTE. Notification equivalent to LTE has an effect in which influences of interference given to another cell can be reduced when a base station in New RAT and a LTE base station are in the same frequency band.

When four patterns are specified from the above (a) to (g) (or (a) to (i)) as patterns of symbol structure by using the signaling of the higher layer, the base station 100 notifies the terminal 200 of a pattern to be used for actual data allocation for each slot or a plurality of slots, by using two bits included in the DCI. The DCI including the selected patterns may be transmitted by, for example, group common PDCCH or UE specific DCI.

Figure 8:
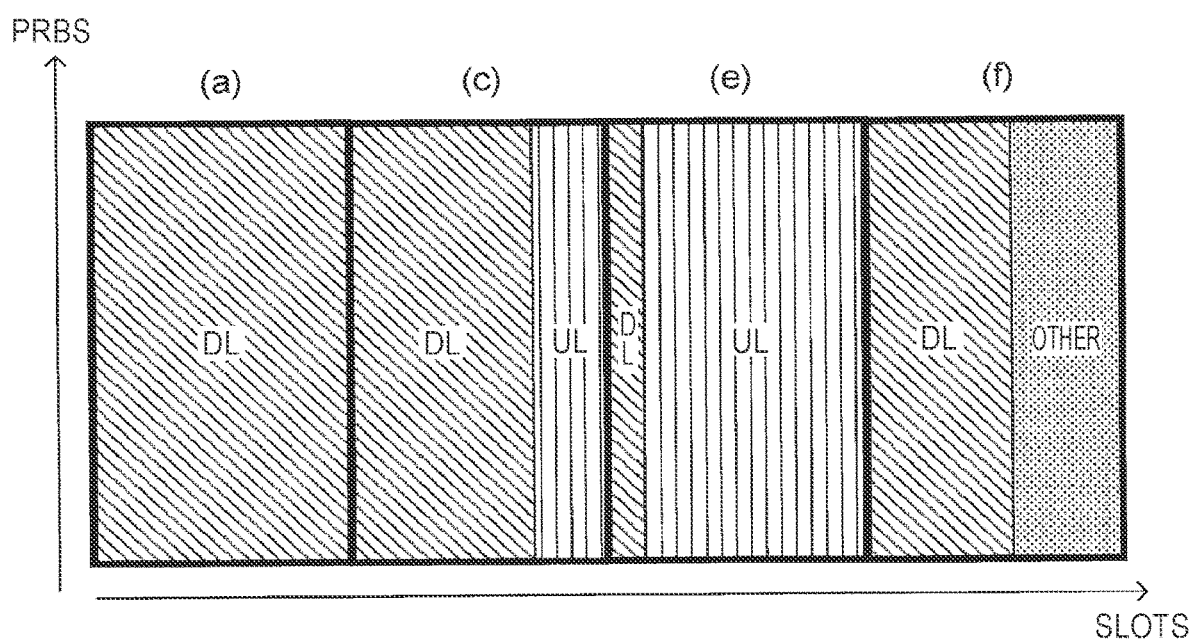
FIG. 8 depicts an example of structure of a slot according to Embodiment 2.

For example, when notification is provided from the base station 100 to the terminal 200 that four patterns are the patterns (a), (c), (e), and (f) for each slot by using the DCI, allocation for each slot is as depicted in FIG. 8.

The terminal 200 specifies a DL symbol, UL symbol, and symbol to be used for another use purpose in the slot, based on the patterns, notification of which is provided by the DCI. Then, from the position (structure) of the specified DL symbol, the terminal 200 can recognize which symbol is to be used to transmit DL data, control signal, reference signal (CSI-RS (channel state information reference signal), DMRS (demodulation reference signal), CRS (cell specific reference signal), PT-RS (phase tracking reference signal)). Also, from the position of the specified UL symbol, the terminal 200 can recognize which symbol is to be used to transmit UL data, UL control signal (ACK/NACK, CSI (channel state information), SR (scheduling request)), reference signal (DMRS, SRS (sounding reference signal))).

Note that while the case has been described in which notification about any of DL, UL, or a symbol to be used for another use purpose is provided as a symbol for each slot, signaling of a higher layer providing notification about only a DL symbol, only a UL symbol, or only a symbol for another use purpose and the DCI may be individually set.

Also, the symbol structure in the slot is not limited to the above pattern (a) to (i), and the number of patterns, notification of which is provided by higher-layer signaling, is not limited to four but may be any number other than four.

Operation Example 2

In Operation Example 2, operation of providing notification about a frequency domain in a slot is described.

The base station 100 provides notification about setting information regarding a plurality of patterns (modes) of the structure of DL and UL frequency domains in one slot or a plurality of slots, by using the signaling of the higher layer. The frequency domains may be represented by, for example, PRB numbers or RBG numbers.

For example, when the DCI has two bits, the base station 100 provides notification about the DL frequency domains X0, X1, X2, and X3 and the UL frequency domains Y0, Y1, Y2, and Y3 corresponding to each of Modes 1 to 4, by using the signaling of the higher layer.

Mode 1: DL frequency band X0, UL frequency band Y0
Mode 2: DL frequency band X1, UL frequency band Y1
Mode 3: DL frequency band X2, UL frequency band Y2
Mode 4: DL frequency band X3, UL frequency band Y3

Then, the base station 100 notifies the terminal 200 of any one mode of Modes 1 to 4 as a mode to be used for data allocation, by using the DCI of two bits.

The terminal 200 receives the signaling of the higher layer, and recognizes the DL frequency domains X0, X1, X2, and X3 and the UL frequency domains Y0, Y1, Y2, and Y3 in Modes 1 to 4. Then, the terminal 200 receives the DCI, and specifies a frequency domain in one slot or a plurality of slots.

Upon specifying a frequency domain, the terminal 200 can find the arrangement of CSI-RS of DL or the arrangement of RS to be measured for mobility, and thus can use RS in an area without data allocation. Also, the terminal 200 can find, in UL, a frequency band where ACK/NACK, CSI, and SR are to be transmitted or a band where SRS is to be transmitted.

Note that RBG (PRB units, 2 PRB units, 3 PRB units, or 4 PRB units), which is granularity in allocation of DL data or UL data, may be changed depending on the frequency band width for use.

Also, while notification about the DL frequency band and notification about the UL frequency band are separately provided in the above example, notification about a common band may be provided between DL and UL. Also, in addition to the DL frequency band and the UL frequency band, notification about a frequency band for another use purpose may be additionally provided.

In the foregoing, Operation Examples 1 and 2 according to the present embodiment have been described.

Note that with Operation Example 1 and Operation Example 2 in combination, notification about symbols and frequency domains in one slot or a plurality of slots may be provided by signaling of a higher layer.

In this manner, in the present embodiment, the base station 100 provides notification about the setting information regarding a plurality of patterns (modes) indicating the structure of the resource area in a slot (for example, such as part of (a) to (i) described above or X0, X1, X2, X3, Y0, Y1, Y2, or Y3) by higher-layer signaling. Also, the base station 100 selects one pattern (mode) to be used for data allocation from among the plurality of patterns (modes), and provides notification about the selected one pattern by the DCI. The terminal 200 specifies a resource by using a parameter corresponding to the pattern (mode), notification of which is provided by the DCI, from the setting information, notification of which has already been provided by higher-layer signaling.

With this, the base station 100 notifies the terminal 200 of the pattern (mode) by the DCI, thereby allowing dynamic resource allocation in consideration of use for a different use purpose for each slot. Also, the base station 100 is only required to provide notification about the pattern (mode) by using the DCI when changing the structure in the slot, and is not required to provide notification about the resource (for example, such as symbol position or frequency band of data in the slot) every time resource allocation is changed, thereby allowing reduction in DCI signaling overhead.

Thus, according to the present embodiment, notification about the data area (symbol or frequency band of data) can be appropriately provided, and the resource can be flexibly allocated.

Embodiment 3

The basic structures are common between a base station and a terminal according to the present embodiment and the base station 100 and the terminal 200 according to Embodiment 1, and description is thus made by citing FIG. 3 and FIG. 4.

While the control resource set arranged at the top of the slot is assumed as an area where data is not allocated in Embodiment 1, the case is described in the present embodiment in which a signal inserted in the middle of the slot (for example URLLC signal) is assumed.

The URLLC signal is assumed to be transmitted and received in a mini slot configured of symbols less than symbols configuring a slot where another signal is transmitted and received. That is, the mini slot uses a partial portion of the slot. Thus, an area not to be used for the mini slot can be used for transmission and reception of another signal. Thus, it can be thought that notification about an area to be used for the mini slot is provided for each slot.

In the present embodiment, a method is described in which notification about the area to be used for the mini slot is provided together with signaling of a higher layer and the DCI in order to enhance flexibility of data allocation.

In the following, an operation example according to the present embodiment is described.

The base station 100 notifies the terminal 200 where a resource is allocated in slot units of the frequency domain X0 and a symbol number Y0 having a possibility of being occupied by the mini slot, by using signaling of a higher layer. The frequency domain is represented by, for example, a PRB number or RBG number.

Also, the base station 100 provides notification about Mode 1 or Mode 2, which will be described further below, as a mode to be used for data allocation, by using one bit included in the DCI.

The terminal 200 specifies a resource area where data is allocated, based on the setting information (X0 and Y0), notification of which is provided by the signaling of the higher layer, and Mode 1 or Mode 2 indicated in the DCI.

Here, in each mode, for example, data is allocated as follows.

Figure 9A:
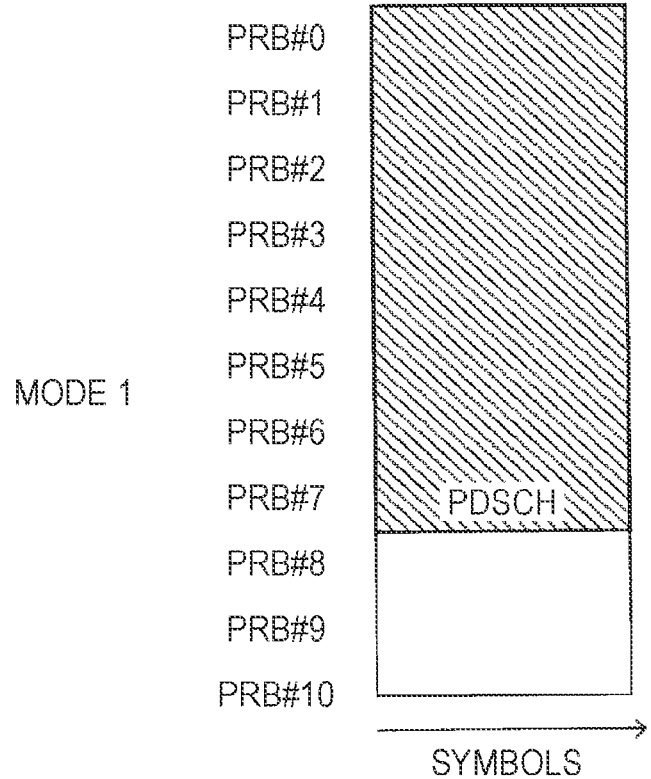
FIG. 9A depicts one example of data allocation according to Embodiment 3.

Mode 1: Data is arranged in an area where data is allocated for the terminal 200 allocated in slot units (for example, refer to FIG. 9A)

Figure 9B:
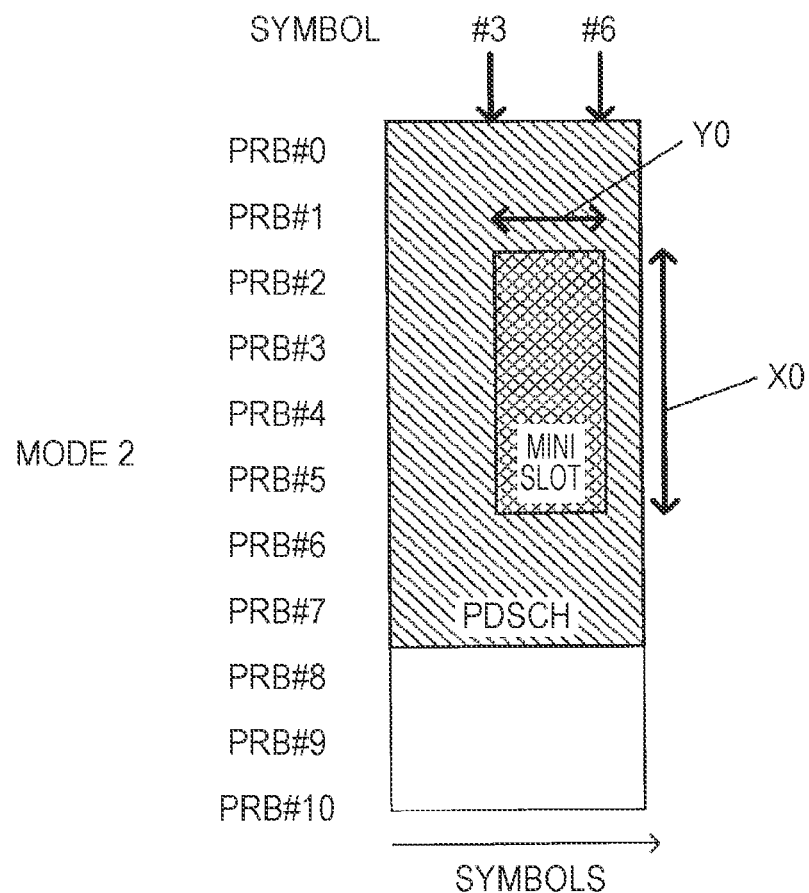
FIG. 9B depicts one example of data allocation according to Embodiment 3.

Mode 2: Data is not arranged at the symbol number Y0 of the frequency domain X0 of the area where data is allocated for the terminal 200 allocated in slot units (for example, refer to FIG. 9B).

Also, {X0, Y0}, notification of which is provided by the signaling of the higher layer, may be set as follows.

Frequency domain X0: PRB #2 to PRB #5
Time domain Y0: Symbols #3, #4, and #5

The frequency domain X0 and the time domain Y0 included in the setting information, notification of which is provided by the higher-layer signaling, represent a part of a resource area having a possibility of being occupied by the mini slot in the slot. Also, in the mode, notification of which is provided by the DCI, Mode 1 where data is not allocated to a part of the resource area corresponding to the mini slot described above and Mode 2 where data is allocated to a part of the resource area corresponding to the mini slot are included.

The base station 100 selects the mode for the terminal 200 in accordance with the situation of resource allocation in the terminal 200 where a resource is allocated in slot units and another terminal where a resource is allocated in mini slot units, and provides notification about the selected mode by the DCI.

With this, since the terminal 200 can recognize that other terminals using the mini slot are not present in Mode 1, all resources allocated to the terminal 200 can be used.

Also, in Mode 2, since there is a possibility that another terminal using the mini slot is present, data can be arranged in the terminal 200 by avoiding an area having a possibility of being used for the mini slot.

In this manner, in the present embodiment, the base station 100 provides notification about the setting information (for example, such as X0 and Y0 described above) regarding a part of a resource area in a slot (an area having a possibility of being occupied by the mini slot) by higher-layer signaling. Also, the base station 100 selects one mode to be used for data allocation from among the plurality of modes, and provides notification about the selected one pattern by the DCI. The terminal 200 specifies a resource allocated to the terminal 200, based on the setting information, notification of which has already been provided by higher-layer signaling, and the modes, notification of which is provided by the DCI.

With this, the base station 100 notifies the terminal 200 of the mode by the DCI, thereby allowing dynamic resource allocation in consideration of use for a different user purpose for each slot. Also, the base station 100 is only required to provide notification about the mode by using the DCI when changing allocation of the data area in the slot, and is not required to provide notification about a resource (for example, such as a resource occupied by the mini slot) every time resource allocation is changed, thereby allowing reduction in DCI signaling overhead.

Thus, according to the present embodiment, notification about the data area can be appropriately provided, and the resource can be flexibly allocated.

Note that the number of modes is not limited to two, and three or more modes will do. In that case, notification about a plurality of resources to be used as mini slots can be provided, and the size of the area of the mini slots can be changed.

Also, the frequency domain X0 and the time domain Y0 where a resource having a possibility of being used as a mini slot is specified are not limited to contiguous areas, and non-contiguous areas may be specified.

Also, a signal to be inserted in the slot is assumed to be a URLLC signal, but may be a signal for another use purpose. For example, the signal may be used for a use purpose such as insertion of a reference signal such as CSI-RS or Sidelink to be used for D2D, or avoidance of transmission for the purpose of interference control.

Embodiment 4

While allocation of DL data (PDSCH) is mainly assumed in Embodiment 1, the case is described in the present embodiment in which allocation of UL data (PUSCH: physical uplink shared channel) is assumed.

While the terminal can recognizes ACK/NACK, CSI, SR, and SRS areas allocated to the terminal itself, the terminal cannot recognize an area allocated to another terminal or an area to be used for another use purpose (for example, Sidelink, URLLC, and mMTC). As described above, while the base station can provide notification about the resource area not allocated to the terminal by using the signaling of the higher layer and perform data allocation by avoiding the resource area, notification about the resource area by using the signaling of the higher layer makes allocation semi-static. Since use for a different use purpose can be thought for each slot in New RAT, there is a problem in that only with notification by the higher layer, flexibility of resource allocation is low.

Thus, in the present embodiment, as with Embodiment 1, notification about the area usable for UL data is provided by combining the signaling of the higher layer and the DCI.

Note that the basic structures are common between a base station and a terminal according to the present embodiment and the base station 100 and the terminal 200 according to Embodiment 1 and description is thus made by citing FIG. 3 and FIG. 4.

Specifically, the base station 100 sets a plurality of modes (patterns) of a frequency domain or time domain regarding data allocation. Also, the base station 100 transmits setting information regarding the set plurality of modes (parameters indicating the frequency domain or time domain) to the terminal 200 by using signaling of a higher layer (SIB or dedicated RRC).

Also, the base station 100 selects one mode from among the plurality of modes at the time of data allocation and, based on the selected mode, specifies a resource area usable for allocation of UL data, for example, for each PRB. Then, the base station 100 transmits data allocation information and the DCI including the selected mode to the terminal 200.

Meanwhile, based on the setting information included in the received signaling of the higher layer and the DCI, the terminal 200 specifies a resource area (for example, PRB units) usable for allocation of UL data.

In this manner, in the present embodiment, when providing notification about allocation information of UL data, the base station 100 provides notification about the setting information regarding the plurality of modes of UL data allocation by higher-layer signaling, and provides notification about one mode to be used for actual UL data allocation by the DCI. That is, notification about UL data allocation is provided by using the signaling of the higher layer and the DCI together.

With this, as with Embodiment 1 (DL allocation), the base station 100 is only required to provide notification about one mode by the DCI at the time of data allocation, and is not required to provide notification about the setting information regarding the frequency domain or time domain for every data allocation. Thus, while overhead of signaling of the DCI is reduced, an area to be used for anything other than data can be excluded from the data area. Also, since the base station 100 can dynamically change the modes to be used for data allocation from among the plurality of modes by the DCI, data can be flexibly allocated.

In the following, an operation example according to the present embodiment is described.

In the following, as with Operation Example 2 of Embodiment 1, the case is described in which four modes (Mode 1, Mode 2, Mode 3, and Mode 4) are prepared by signaling of a higher layer and switching is made among Mode 1, Mode 2, Mode 3, and Mode 4 by using two bits included in the DCI.

FIG. 10 depicts one example of Mode 1, Mode 2, Mode 3, and Mode 4 according to the present operation example.

Specifically, the base station 100 sets, for example, Mode 1 to Mode 4 depicted in FIG. 10 as modes of data allocation. Also, as setting information regarding Mode 1 to Mode 4, the base station 100 provides notification about frequency domains "X0" and "X1" and end symbols "A0", "A1", "A2", "A3", "A4", and "A5" of data by using signaling of a higher layer. Here, as will be described further below, A0 is a parameter regarding Mode 1; A1 is a parameter regarding Mode 2; X0, A2, and A3 are parameters regarding Mode 3; and X1, A4, and A5 are parameters regarding Mode 4. The frequency domains X0 and X1 may be represented by, for example, PRB numbers or RBG numbers.

Also, by using two bits included in the DCI, the base station 100 notifies the terminal 200 of any one mode, that is, Mode 1, Mode 2, Mode 3, or Mode 4, as a mode to be used for data allocation.

The terminal 200 specifies a resource area where data is allocated, based on information corresponding to the mode indicated in the DCI of the setting information regarding Mode 1 to Mode 4, notification of which is provided by the signaling of the higher layer.

Here, in each mode, for example, data is allocated as follows.

Mode 1: Data is allocated to the symbol A0.
Mode 2: Data is allocated to the symbol A1.
Mode 3: Data is allocated to the symbol A2 in the frequency domain X0, and data is allocated to the symbol A3 in a frequency domain other than X0.
Mode 4: Data is allocated to the symbol A4 in the frequency domain X1, and data is allocated to the symbol A5 in a frequency domain other than X1.

Also, {X0, X1, A0, A1, A2, A3, A4, A5}, notification of which is provided by the signaling of the higher layer as setting information, may be set as follows.

Frequency domain X0: The same frequency domain as ACK/NACK
Frequency domain X1: A frequency domain with ACK/NACK and CSI added together
A0: A symbol previous to a symbol where ACK/NACK, CSI, and SRS are arranged
A1: The last symbol of the slot
A2: A symbol previous to a symbol where ACK/NACK is arranged
A3: The last symbol of the slot
A4: A symbol previous to ACK/NACK or CSI
A5: The last symbol of the slot That is, regarding Mode 1, A0 indicates an end position of a time domain where the UL data signal is allocated.

Also, regarding Mode 2, A1 indicates an end position of a time domain where the UL data signal is allocated.

Also, regarding Mode 3, X0 indicates a frequency domain where a UL control signal (for example, such as ACK/NACK) is allocated, A2 indicates an end position of a time domain where the UL data signal is allocated in the frequency domain X0, and A3 indicates an end position of a time domain where the UL data signal is allocated in a frequency domain other than the frequency domain X0.

Also, regarding Mode 4, X1 indicates a frequency domain where a UL control signal (for example, such as ACK/NACK or CSI) is allocated, A4 indicates an end position of a time domain where the UL data signal is allocated in the frequency domain X1, and A5 indicates an end position of a time domain where the UL data signal is allocated in a frequency domain other than the frequency domain X1.

That is, in Mode 1, as depicted in FIG. 10, irrespective of the data resource (resources indicated in the UL allocation information) where data (PUSCH) is allocated, the terminal 200 specifies an end position of a symbol where data (PUSCH) is allocated, based on the end symbol (A0), notification of which is provided by the signaling of the higher layer. That is, in Mode 1, data is allocated to the symbol A0 in the entire band of the data resource.

In Mode 2, data is allocated to a symbol different from that of Mode 1 (in FIG. 10, the last symbol of the slot). That is, in Mode 2, as depicted in FIG. 10, data (PUSCH) is allocated to the last symbol of the slot, irrespective of the data resource. In this manner, since data is allocated to the last symbol of the slot in Mode 2, Mode 2 is effective when, for example, data is allocated for the terminal 200 in a frequency domain not overlapping the UL control signal or reference signal.

In Mode 3, the end symbol where data is allocated is different between the frequency domain X0 and a domain other than the frequency domain X0. In Mode 3, the terminal 200 can arrange data by avoiding ACK/NACK (last symbol of the slot) in the frequency domain X0, and can arrange data to the last symbol of the slot in the domain other than the frequency domain X0. This allows the resource to be effectively used. In this manner, Mode 3 is effective when data is allocated in a frequency domain overlapping the frequency domain X0 (ACK/NACK).

In Mode 4, as with Mode 3, the end symbol where data is allocated is different between the frequency domain X1 and a domain other than the frequency domain X1. In Mode 4, the terminal 200 can arrange data in the frequency domain X1 by avoiding the control signal (ACK/NACK and CSI), and can arrange data to the last symbol of the slot in the domain other than the frequency domain X1. This allows the resource to be effectively used. In this manner, Mode 4 is effective when data is allocated in a frequency domain overlapping the frequency domain X1 (ACK/NACK and CSI). However, when the number of symbols of ACK/NACK is different from that of CSI, A4 is required to be set in accordance with the one with a larger number of symbols.

For example, it is only required that the base station 100 selects one mode suitable for an allocation resource of UL data from among the plurality of modes, based on a relation between the allocation resource (data resource) of the UL data signal (PUSCH) and the allocation resource of the control signal (such as ACK/NACK or CSI) (for example, such as the presence or absence of overlap).

Note that the frequency domains X0 and X1 may be the same frequency domain of ACK/NACK, CSI, SRS, or SR, or may be a frequency domain with these added together.

Also the frequency domains X0 and X1 may be indicated in PRB units or RBG units. When indication of the frequency domains X0 and X1 is made in PRB units or RBG units, the base station 100 can more flexibly instruct the terminal 200 on the resource, and it is thus possible to avoid a frequency domain of a control signal, reference signal, or data allocated to another mobile station or avoid an area to be used for another use purpose.

Also, A0, A1, A2, A3, A3, and A5 may be symbols previous to symbols where ACK/NACK, CSI, SRS, or SR is arranged, and notification about a symbol number may be provided. Also, A0, A1, A3, and A5 may be the last symbols of a slot or subframe. Alternatively, A0, A2, and A4 may have the same value, and A1, A3, and A5 may have the same value.

In this manner, in the present embodiment, the base station 100 provides notification about the setting information regarding the plurality of modes of the resource area where data is allocated (for example, such as X0, X1, A0, A1, A2, A3, A4, and A5) by higher-layer signaling. Also, the base station 100 selects one mode to be used for data allocation from among the plurality of modes, and provides notification about the selected one pattern by the DCI. The terminal 200 specifies a resource by using a parameter corresponding to the mode, notification of which is provided by the DCI, from the setting information, notification of which has already been provided by higher-layer signaling.

With this, the base station 100 notifies the terminal 200 of the mode by the DCI, thereby allowing dynamic resource allocation in consideration of use for a different use purpose for each slot. Also, the base station 100 is only required to provide notification about the mode by using the DCI when changing resource allocation, and is not required to provide notification about the resource (for example, such as the symbol start position of data for each frequency domain) every time resource allocation is changed, thereby allowing reduction in DCI signaling overhead.

Also, the base station 100 selects the mode in accordance with the resource (control resource set) where the control signal channel is arranged, thereby allowing flexible data allocation to be performed by avoiding a resource area not allocated for the terminal 200 in each slot.

Thus, according to the present embodiment, notification about the data area (data start position) can be appropriately provided in consideration of an area where the UL control signal is arranged, and the resource can be flexibly allocated.

In the foregoing, each of the embodiments of the present disclosure has been described.

Note that while the case has been described in the above embodiments in which notification about the mode is provided by using one bit or two bits included in the DCI. The embodiments are not limited to this, and notification about the mode may be provided by using bits more than two bits included in the DCI. Also, the number of modes is not limited to two or four, but may be any.

Also, while physical mapping has been described as one example for the frequency domain (PRB #) in the above embodiments, the embodiments can also be applied to logical mapping. In the case of logical mapping, since logical mapping is changed to physical mapping, even frequency domains contiguous in logical mapping are arranged at physically separated positions, thereby acquiring the frequency diversity effect.

Also, the above DCI may be transmitted by group common PDCCH, PDCCH (UE-specific DCI) transmitted at the time of data allocation of the terminal 200 (UE), or another PDCCH transmitted by the group common control resource set. When the DCI is transmitted by group common PDCCH, a plurality of terminals receive the same settings, and overhead can thus be reduced. Also, when the DCI is transmitted by individual PDCCH, settings can be individually made for each terminal. Also, the DCI is not limited to be transmitted by the group common resource set and the UE specific control resource set but also by another resource.

Also, group common PDCCH may be defined with a different name, such as PCFICH (physical control format indicator channel), PSFICH (physical slot format indicator channel), or PDCCH type 0.

Also, a group common control resource set may be referred to as a common control resource set, a group common search space, or a common search space. Also, a control resource set may be referred to as CORESET.

Also, the signaling of the higher layer may be replaced by signaling of MAC. In the case of signaling of MAC, compared with signaling of RRC, the frequency of changes of the mode to be set to the UE can be increased.

The present disclosure can be implemented by software, hardware, or software in cooperation with hardware. The respective functional blocks used for description of the above embodiments may be implemented, partially or entirely, as an LSI, which is an integrated circuit, and the respective processes described in the above embodiments may be controlled, partially or entirely, by one LSI or a combination of LSIs. The LSI may be configured of individual chips or may be configured of one chip so as to include the entire or part of the functional blocks. The LSI may include an input and an output of data. The LSI may be referred to as an IC, system LSI, super LSI, or ultra LSI, depending on the difference in the degree of integration. A scheme for making an integrated circuit is not limited to the LSI, but may be implemented by a dedicated circuit, a general-purpose processor, or a dedicated processor. Also, an FPGA (field programmable gate array) programmable after manufacture of the LSI or a reconfigurable processor in which connection and settings of a circuit cell inside the LSI can be reconfigured may be used. The present disclosure may be implemented as digital processing or analog processing. Furthermore, if a technique for making an integrated circuit which replaces the LSI emerge by the advance of semiconductor technology or another derivative technology, as a matter of course, that technique may be used to integrate the functional blocks. One possibility is, for example, application of biotechnology.

A base station of the present disclosure includes a circuit which selects one pattern to be used for data allocation from among a plurality of patterns of a resource area where data is allocated, and a transmitter which provides notification about setting information regarding the plurality of patterns by higher-layer signaling and provides notification about the selected one pattern by a downlink control signal (DCI).

In the base station of the present disclosure, the setting information indicates a start position of a time domain where the data of a downlink is allocated.

In the base station of the present disclosure, the setting information indicates a frequency domain where a control signal of a downlink is allocated, a start position of a time domain where the data of the downlink is allocated in the frequency domain, and a start position of a time domain where the data of the downlink is allocated in a frequency domain other than the frequency domain.

In the base station of the present disclosure, the setting information indicates a plurality of patterns of a symbol structure in a slot configured of a downlink symbol, an uplink symbol, or a symbol to be used for another use purpose.

In the base station of the present disclosure, the setting information indicates a plurality of patterns of structure of a frequency band to be used for a downlink, an uplink, or another use purpose in a slot.

In the base station of the present disclosure, the setting information indicates a part of a resource area in a slot, and the plurality of patterns include a pattern in which the data is allocated in the part of the resource area and a pattern in which the data is not allocated in the part of the resource area.

In the base station of the present disclosure, the setting information indicates an end position of a time domain where the data of an uplink is allocated.

In the base station of the present disclosure, the setting information indicates a frequency domain where a control signal of an uplink is allocated, an end position of a time domain where the data of the uplink is allocated in the frequency domain, and an end position of a time domain where the data of the uplink is allocated in a frequency domain other than the frequency domain.

A terminal of the present disclosure includes a receiver which receives higher-layer signaling including setting information regarding a plurality of patterns of a resource area where data is allocated and receives a downlink control signal (DCI) indicating one pattern to be used for data allocation from among the plurality of patterns, and a circuit which specifies a resource where the data is allocated, based on the setting information and the downlink control signal.

A communication method of the present disclosure includes selecting one pattern to be used for data allocation from among a plurality of patterns of a resource area where data is allocated, and providing notification about setting information regarding the plurality of patterns by higher-layer signaling and providing notification about the selected one pattern by a downlink control signal (DCI).

A communication method of the present disclosure includes receiving higher-layer signaling including setting information regarding a plurality of patterns of a resource area where data is allocated and receiving a downlink control signal (DCI) indicating one pattern to be used for data allocation from among the plurality of patterns, and determining a resource where the data is allocated, based on the setting information and the downlink control signal.

One aspect of the present disclosure is useful for mobile communication systems.

REFERENCE SIGNS LIST 100 base station
101 setting unit
102 DCI generation unit
103, 207 error correction coding unit
104, 208 modulation unit
105, 209 signal allocation unit
106, 210 transmission unit
107, 201 reception unit
108, 202 signal separation unit
109, 204 demodulation unit
110, 205 error correction decoding unit
200 terminal
203 DCI reception unit
206 setting information reception unit

The invention claimed is:

1. A communication apparatus, comprising:
a receiver, which, in operation,
receives a higher layer signaling which indicates four resource patterns for a physical downlink shared channel (PDSCH), each of the four resource patterns indicating a frequency resource pattern in a frequency domain and a time resource pattern in a time domain in one or two slots, wherein at least one of the four resource patterns indicates a resource excluded from allocation of the PDSCH in the one or two slots, and
receives downlink control information (DCI) containing 2-bit information which notifies a selected resource pattern from the four resource patterns; and
circuitry, which is coupled to the receiver and which, in operation, decodes the PDSCH based on the selected resource pattern.

2. The communication apparatus according to claim 1, wherein the at least one of the four resource patterns indicates resource blocks (RBs) of the frequency resource pattern which are not available for allocation of the PDSCH.

3. The communication apparatus according to claim 1, wherein the at least one of the four resource patterns indicates a starting symbol of the time resource pattern for allocation of the PDSCH.

4. The communication apparatus according to claim 1, wherein the frequency resource pattern is indicated in units of a resource block (RB).

5. The communication apparatus according to claim 1, wherein each of the four resource patterns indicates the frequency resource pattern occupied by a mini slot.

6. The communication apparatus according to claim 1, wherein the selected resource pattern dynamically indicates the resource excluded from allocation of the PDSCH.

7. A communication method implemented by a communication apparatus, the communication method comprising:
receiving a higher layer signaling which indicates four resource patterns for a physical downlink shared channel (PDSCH), each of the four resource patterns indicating a frequency resource pattern in a frequency domain and a time resource pattern in a time domain in one or two slots, wherein at least one of the four resource patterns indicates a resource excluded from allocation of the PDSCH in the one or two slots;
receiving downlink control information (DCI) containing 2-bit information which notifies a selected resource pattern from the four resource patterns; and
decoding the PDSCH based on the selected resource pattern.

8. The communication method according to claim 7, wherein the at least one of the four resource patterns indicates resource blocks (RBs) of the frequency resource pattern which are not available for allocation of the PDSCH.

9. The communication method according to claim 7, wherein the at least one of the four resource patterns indicates a starting symbol of the time resource pattern for allocation of the PDSCH.

10. The communication method according to claim 7, wherein the frequency resource pattern is indicated in units of a resource block (RB).

11. The communication method according to claim 7, wherein each of the four resource patterns indicates the frequency resource pattern occupied by a mini slot.

12. The communication method according to claim 7, wherein the selected resource pattern dynamically indicates the resource excluded from allocation of the PDSCH.

\* \* \* \* \*